Oct. 11, 1960     H. T. WHITE     2,956,188

SEALLESS MOTOR FOR VALVE OPERATION

Filed April 6, 1956

INVENTOR.
HOWARD T. WHITE

BY

ATTORNEY.

United States Patent Office 2,956,188
Patented Oct. 11, 1960

2,956,188

SEALLESS MOTOR FOR VALVE OPERATION

Howard T. White, Melrose Park, Pa., assignor to Fostoria Corporation, Fostoria, Ohio, and Huntingdon Valley, Pa., a corporation of Ohio Filed Apr. 6, 1956, Ser. No. 576,559

5 Claims. (Cl. 310—86)

This invention relates to sealless electric motors for valve operation and more particularly to a sealless electric motor having an isolated stator and an enclosed rotor for positioning a valve stem as desired.

It is the principal object of the present invention to provide an enclosed electric motor of the sealless type for positioning the valve stem of a motor operated valve.

It is a further object of the present invention to provide a sealless motor for positioning a valve stem having a stem position indicator.

It is a further object of the present invention to provide a sealless electric motor for operating a valve stem or the like having improved provisions for converting the rotary motion of the rotor to reciprocating valve stem motion.

It is a further object of the present invention to provide a sealless motor for valve operation and the like having a sealed stator and an enclosed rotor chamber with lubricating fluid therein, the lubricating fluid being utilized in connection with the operation of the valve stem.

It is a further object of the present invention to provide a sealless motor for operating valve stems and the like having provisions for accommodating misalignment between the motor and the valve.

It is a further object of the present invention to provide a sealless motor of the character aforesaid which is simple in its construction and can be quickly and easily assembled.

Other objects and advantageous features of the invention will be apparent from the specification and claims.

The nature and characteristic features of the invention will be more readily understood from the following description, taken in connection with the accompanying drawings forming part thereof, in which.

Figure 2:
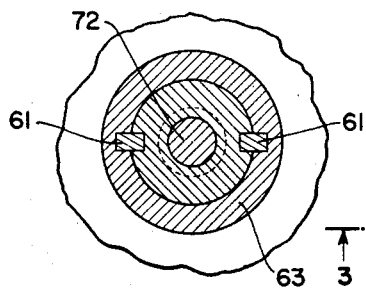
Fig. 2 is a fragmentary sectional view taken approximately on the line 2—2 of Fig. 1.
Figure 3:
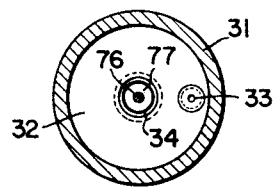
Fig. 3 is a sectional view taken approximately on the line 3—3 of Fig. 1.

Referring now more particularly to the drawings a motor housing is provided having an outer cylindrical casing portion 10 in overlapping relation, and welded or otherwise secured at one end to an inner end plate 11. The casing portion 10 is similarly engaged with and secured at the other end to an inner plate 12 in spaced parallel relation to the plate 11.

A hollow cylindrical sleeve 13 is provided, preferably of stainless steel or other non-magnetic responsive metal which is also not subject to corrosion by the liquid in contact therewith. The sleeve 13 extends through an opening 14 in the end plate 11 and is welded or otherwise secured thereto at 15. The sleeve 13 also extends through an opening 16 in the end plate 12 and is welded or otherwise secured thereto as at 17.

A motor stator chamber 18 is thus provided between the casing portion 10 and the sleeve 13 and between the inner end plate 11 and the inner end plate 12, which has disposed therein, and sealed from contact by the liquid being handled, motor field laminations 19 and motor field windings 20. The windings 20 are connected to any suitable source of alternating current for energization by conductors (not shown) extending through a suitable fluid tight seal (not shown).

A hollow cylindrical reinforcing sleeve 21 may be provided, exteriorly of and in engagement with the sleeve 13, between the laminations 19 and the end plates 11 and 12, if pressure conditions within the interior of the sleeve 13 reach a level such that the use of such a reinforcing sleeve 21 is considered advisable.

The inner end plate 11 has secured thereto an outer end closure plate 25 which closes the opening at this end of the sleeve 13 and is held in position with respect to the plate 11 by a plurality of studs 26 which engage in blind threaded holes 27 in the plate 11.

A sealing gasket 28, which may be an O-ring, of rubber, natural or synthetic, or other like compressible or resilient material, resistant to and not subject to corrosion by the liquid utilized in connection with the valve is interposed between the facing surfaces of the plate 11 and the plate 25, and is held in compressed and fluidtight condition by the studs 26.

The end plate 25 has an inwardly extending positioning rim 29 which engages the interior of the sleeve 13. The end plate 25 also has a central boss 30 from which a hollow cylindrical housing 31 extends, the housing 31 being secured to the end plate 25, in any desired manner to prevent fluid leakage at this location. The housing 31 has an end wall plate 32 secured thereto in any desired manner such as by welding or the like. If the motor is used so that the end wall plate 32 is disposed in a horizontal position, it may, for certain types of operation, have an air venting orifice 33 mounted thereon for purposes to be explained.

The end wall plate 32 can have an indicator housing 34 closed at its outer end secured thereto in fluidtight relation and extending therefrom, and axially aligned with the housing 31. The indicator housing 34 is preferably of non-magnetizable or non-magnetic responsive material.

The indicator housing 34 can be provided with suitable calibrated markings 35 and has freely slidable therealong a magnetic or magnetic responsive ring 36, the position of which with respect to the markings 35 is utilized to indicate the position of the valve stem, as herein explained.

The boss 30 has mounted therein a cylindrical bearing 37, which can be of graphite or the like, carried in a metallic mounting ring 37a, and within which a cylindrical portion 39 of a stem nut 40, hereinafter more fully described, is rotatably mounted. A predetermined limited clearance is preferably provided between the interior surface of the bearing 37 and the exterior surface of the cylindrical portion 39 to permit a limited fluid flow therebetween.

The inner end plate 12 has an outer end plate 41 secured thereto which closes the opening 16 at this end of the sleeve 13 and is held in position with respect to the end plate 12 by a plurality of studs 42 which engage in blind threaded holes 43 in the plate 12.

A sealing gasket 44, which may be an O-ring, of rubber, natural or synthetic, or other like compressible or resilient material, resistant to and not subject to corrosion by the liquid, being utilized in connection with the valve, is interposed between the facing surfaces of the end plates 12 and 41 and is compressed by the tightening of the studs 42.

A motor rotor chamber 45 is thus pivoted within the sleeve 13 and between the end plates 25 and 41.

The end plate 41 has an inwardly extending positioning rim portion 46 which engages the interior of the sleeve 13. The end plate 41 also has a central hollow interiorly extending boss 47 within which a cylindrical bearing 48, which can be of graphite or the like, carried in a metallic mounting ring 48a, is provided for the mounting for rotation of a cylindrical portion 49 of the stem nut 40. A predetermined limited clearance is preferably provided between the interior surface of the bearing 48 and the exterior surface of the cylindrical portion 49 to permit a limited fluid flow therebetween.

The valve housing is illustrated in part at 50 and includes a recessed portion 51 within which an end face of the end plate 41 is in engagement.

A sealing gasket 52, which may be an O-ring, of rubber, natural or synthetic, or other like compressible or resilient material, resistant to and not subject to corrosion by the liquid controlled by the valve is interposed between the facing surface 53 of the end plate 41 and the corresponding face 54 of the valve housing 50, and the valve housing 50 and the end plate 41 are held together by studs 50a.

The valve housing 50 also has a bearing chamber 55 therein for the reception of spaced thrust bearings 56 and 57. The chamber 55 has a face 58 at its inner end. The thrust bearing 56 is adapted to abut, under certain conditions, against the face 53 and the thrust bearing 57 is adapted to abut, under certain conditions, against the face 58.

The stem nut 40 has a peripheral flange 60 therein in engagement with the thrust bearings 56 and 57 for transmitting the thrust, in accordance with the direction of occurrence against one or the other of the faces 53 or 58.

The stem nut 40 has a plurality of keys 61 inserted therein engageable with slots 62 in a rotor supporting sleeve 63. The rotor sleeve 63 abuts against a shoulder 64 on the exterior of the stem nut 40. The stem nut 40 also has an exteriorly threaded portion 65 for the reception of a lock nut 66 for holding the rotor sleeve 63 in position on the keys 61 and against the shoulder 64.

The rotor sleeve 63 has spaced end cover plates 67 welded or otherwise secured thereto in fluid-tight relation and extending outwardly from its opposite ends. The peripheries of the end cover plates 67 have welded or otherwise secured thereto in fluidtight relation a cylindrical rotor housing 68.

Within the sealed and isolated interior of the housing 68 and between the end cover plates 67, the motor rotor poles 69 are provided, these preferably being of the short circuited type and protected by their enclosure. The housing 68 and end cover plates 67 are preferably made of a material resistant to or not subject to corrosion by the liquid being controlled by the valve.

The stem nut 40 is provided, interiorly of the portion thereof at which the keys 61 are located, with an interiorly threaded portion 70 with which the complementally threaded portion 71 of a valve stem 72 is in engagement. The valve stem 72 extends in the interior of the stem nut 40 through the chamber 55 and through the valve housing 50 to the valve (not shown). It will be noted that there is a sidewise clearance of appreciable amount between the valve rod 72 and the interior of the stem nut 40 and between the threaded portion 70 and the housing 50 to permit of accommodating movement of the valve stem 72.

The valve stem 72 has an abutment ring 73 mounted thereon with seal rings 74 on either side thereof, to reduce the fluid flow past the rings 74 and a resilient seal washer 75 can also be provided between the interior of the stem nut 40 and the exterior of the valve rod 72 for the same purpose.

On the other end of the valve rod 72, an indicator rod 76 is mounted, and movable therewith, extends into the indicator housing 34 and preferably has a magnetic or magnetic responsive part 77 carried thereby for positioning the ring 36 in accordance with the positioning of the stem 72.

The mode of operation will now be pointed out.

Upon energization of the winding 20 with current of a predetermined polarity, the motor rotor poles 69, the rotor housing 67, 68, and the stem nut 40 are rotated in a predetermined direction to move the stem 72 by the engagement thereof with the threaded portion 70. The stem 72 is shown in solid lines in Fig. 1 at one of its limit positions and the other limit position is shown in broken lines.

The stem nut 40, with its portions 39 and 49 journalled in the bearings 37 and 48, serves as a shaft for the motor rotor.

Figure 1:
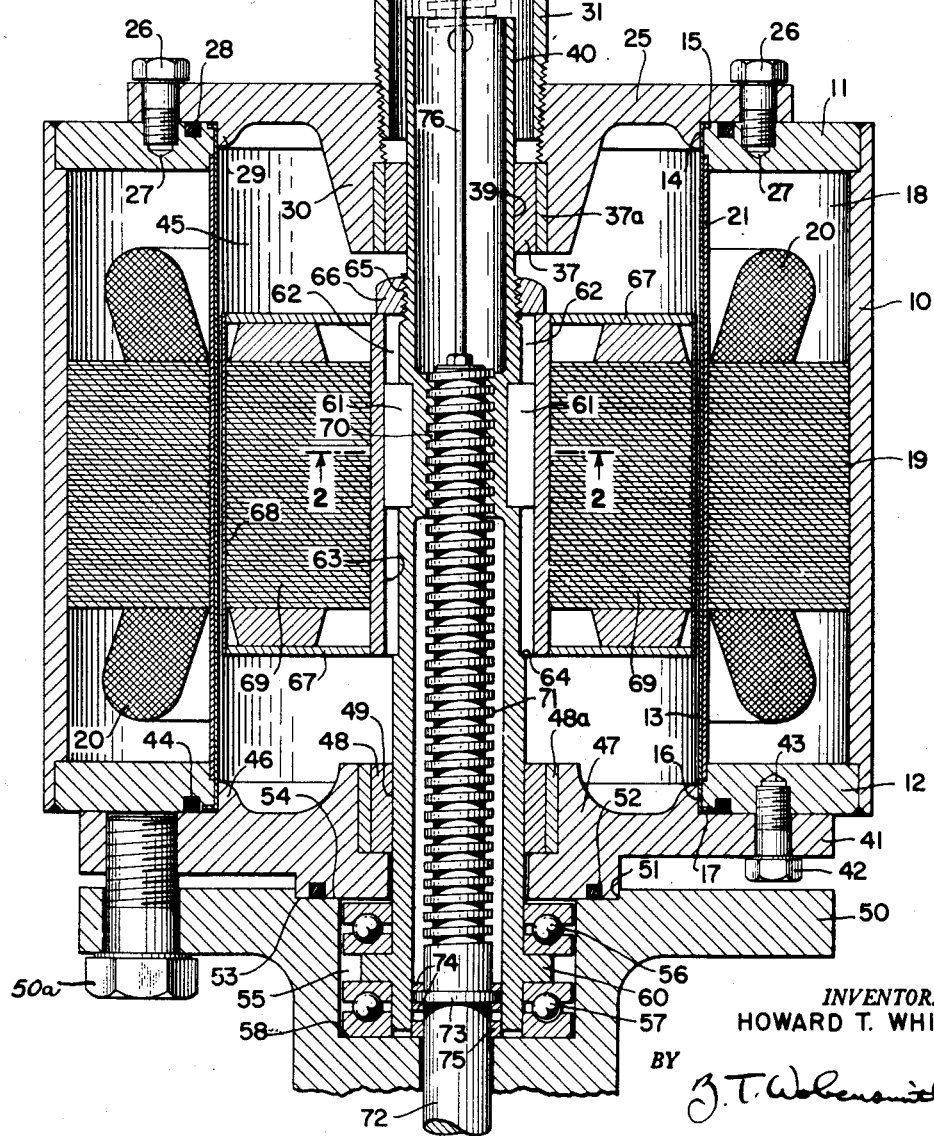
Figure 1 is a vertical central sectional view of a preferred form of motor in accordance with the invention.

As the stem 72 moves upwardly, as seen in Fig. 1, air within the housing 31 is vented through the restriction 33 at a rate determined by the size of the restriction 33. Fluid trapped in the space which includes and is in direct communication with the interior of the housing 31 increases the load on the motor.

Liquid confined within the space above the bearing 37 is forced downwardly through the clearance space between the portion 39 and the bearing 37 into the mid portion of the motor rotor chamber 45, around the motor rotor between the housing 68 and the sleeve 13, then through the clearance space between the portion 49 and the bearing 48 and into the interior of the valve housing 50.

Any liquid from the valve housing 50, will be kept from contact with the motor stator which is isolated and sealed within the motor stator chamber 18.

Liquid from the valve housing 50 will be kept from contact with the motor rotor by reason of the enclosure thereof within the housing 68 and between the end plates 67.

Liquid from the valve housing 50 will be available for lubricating the bearings 37 and 48.

I claim:

1. A motor driven device comprising a bearing housing having an opening therethrough with an interior bearing receiving chamber, said chamber having an end wall providing a thrust bearing abutment, spaced opposed axial thrust bearings mounted in said bearing chamber and one of which is in engagement with said abutment, a hollow cylindrical shaft member extending into said bearing receiving chamber and through said opening, a thrust collar on the exterior of said shaft member between and engaging said thrust bearings, a motor having a housing with spaced end members, an inner cylindrical sleeve extending between said end members and providing therewith an isolated motor stator chamber, a motor stator in said motor stator chamber, the interior of said sleeve providing a motor rotor chamber, inner and outer end closure plates secured to said end members at the ends of said motor rotor chamber, said inner end closure plate having a central opening aligned with said housing opening, said inner end closure plate being secured to said bearing housing and having a wall portion in facing relation to said chamber wall and providing a thrust bearing abutment for the other of said axial thrust bearings, said end closure plates each having a hollow cylindrical bearing mounted therein within said sleeve and aligned with said central openings, said hollow shaft member being supported radially by said cylindrical bearings, a motor rotor on said hollow shaft member between said cylindrical bearings and interiorly of said motor stator, said hollow shaft member having an interiorly threaded portion disposed wholly within said motor rotor, and an operating stem longitudinally disposed in said cylindrical member and having an operating portion extending through the bearing housing opening and the inner end closure opening and beyond said bearing housing on the opposite side thereof with respect to said motor housing, said stem having an exteriorly threaded portion in engagement with said interiorly threaded portion, the thrust to and from said stem in both longitudinal axial directions being confined to said stem, said hollow shaft member, said thrust bearings, said bearing housing and said inner end closure plate.

2. A motor driven device as defined in claim 1 in which the interiorly threaded portion of said hollow shaft member is disposed wholly within said motor rotor and has a longitudinal axial dimension along said shaft less than the longitudinal axial dimension of said motor rotor.

3. A motor driven device as defined in claim 1 in which the outer end closure member has a longitudinally axially extending tubular housing mounted thereon and extending therefrom in alignment with the central opening therein, and said tubular housing is provided with a restricted vent for providing a load on said motor upon movement of said stem at the opposite end of said hollow shaft from the location of said operating portion.

4. A motor driven device as defined in claim 1 in which the motor rotor is detachably secured to the exterior of the hollow shaft member.

5. A motor driven device as defined in claim 1 in which said hollow shaft member has a shoulder on the exterior thereof against which said motor rotor is in engagement, and holding members are provided for securing said motor rotor to said shaft member.

References Cited in the file of this patent

UNITED STATES PATENTS

| | | |
|---|---|---|
| 865,556 | Andersen | Sept. 10, 1907 |
| 1,454,777 | Walker | May 8, 1923 |
| 2,291,783 | Baak | Aug. 4, 1942 |
| 2,317,549 | Muller et al. | Apr. 27, 1943 |
| 2,351,211 | Hodgson | June 13, 1944 |
| 2,377,937 | Hervert | June 12, 1945 |
| 2,425,691 | Brewer | Aug. 12, 1947 |
| 2,444,886 | Vickers | July 6, 1948 |
| 2,482,568 | Werner | Sept. 20, 1949 |
| 2,568,548 | Howard et al. | Sept. 18, 1951 |
| 2,654,848 | Schaefer | Oct. 6, 1953 |